United States Patent
Marupaduga

(10) Patent No.: US 11,496,920 B1
(45) Date of Patent: Nov. 8, 2022

(54) USE OF HISTORICAL RATE OF DATA FLOW AS BASIS TO LIMIT QUANTITY OF CONCURRENT AIR-INTERFACE CONNECTIONS

(71) Applicant: Sprint Spectrum L.P., Overland Park, KS (US)

(72) Inventor: Sreekar Marupaduga, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 169 days.

(21) Appl. No.: 16/949,982

(22) Filed: Nov. 23, 2020

(51) Int. Cl.
  *H04W 76/04* (2009.01)
  *H04W 28/02* (2009.01)
  *H04W 48/06* (2009.01)

(52) U.S. Cl.
  CPC ....... *H04W 28/0205* (2013.01); *H04W 48/06* (2013.01); *H04W 28/0268* (2013.01)

(58) Field of Classification Search
  CPC ............. H04W 28/0205; H04W 48/06; H04W 28/0268
  See application file for complete search history.

(56) References Cited

U.S. PATENT DOCUMENTS

| | | | | |
|---|---|---|---|---|
| 7,742,476 B2* | 6/2010 | Branda | ................. | G06F 9/5072 |
| | | | | 370/235 |
| 9,820,289 B1* | 11/2017 | Pawar | ....................... | H04L 5/14 |
| 10,154,074 B1* | 12/2018 | Stoica | .................... | H04L 65/612 |
| 10,231,150 B2* | 3/2019 | Blankenship | ......... | H04W 28/22 |
| 10,880,702 B1* | 12/2020 | Fang | ..................... | H04L 69/321 |
| 10,939,393 B2* | 3/2021 | Chen | .................... | H04W 56/002 |
| 2007/0214286 A1* | 9/2007 | Muqattash | ............ | H04W 52/46 |
| | | | | 709/248 |
| 2008/0240401 A1* | 10/2008 | Mergen | ............... | H04M 3/5133 |
| | | | | 379/243 |
| 2015/0365946 A1* | 12/2015 | Luong | ................... | H04L 1/0003 |
| | | | | 370/329 |
| 2018/0160330 A1* | 6/2018 | Frydman | ............... | H04W 24/02 |
| 2018/0206284 A1* | 7/2018 | Zhou | ..................... | H04B 1/1615 |
| 2019/0246379 A1* | 8/2019 | Vutukuri | ........... | H04W 36/0066 |
| 2020/0120733 A1* | 4/2020 | Winston | ................ | H04W 76/15 |
| 2020/0344739 A1* | 10/2020 | Rofougaran | ...... | H04W 56/0015 |
| 2020/0374802 A1* | 11/2020 | Chu | ................... | H04W 52/0219 |
| 2021/0006272 A1* | 1/2021 | Takeuchi | ................ | H04B 1/04 |

(Continued)

FOREIGN PATENT DOCUMENTS

WO    2015044682 A1    4/2015

*Primary Examiner* — Parth Patel

(57) ABSTRACT

A method and system for controlling maximum quantity of concurrent air-interface connections with an access node. An example method includes a tracking an aggregate rate of data flow served by the access node per time of day. And the example method includes, based on the tracking, determining what aggregate rate of data flow the access node tends to serve at a given time of day. Further, the example method includes, based on the determined aggregate rate of data that the access node tends to serve at the given time of day, (ii) determining a maximum limit on quantity of concurrent air-interface connections with the access node, and (iii) proactively configuring the access node to apply, at the given time of day, the determined maximum limit on quantity of concurrent air-interface connections with the access node.

20 Claims, 4 Drawing Sheets

(56) References Cited

U.S. PATENT DOCUMENTS

| | | | |
|---|---|---|---|
| 2021/0084524 A1* | 3/2021 | Foti | H04W 80/00 |
| 2021/0211921 A1* | 7/2021 | Swartz | H04L 41/0816 |
| 2022/0201702 A1* | 6/2022 | Razavi | H04L 5/0005 |

* cited by examiner

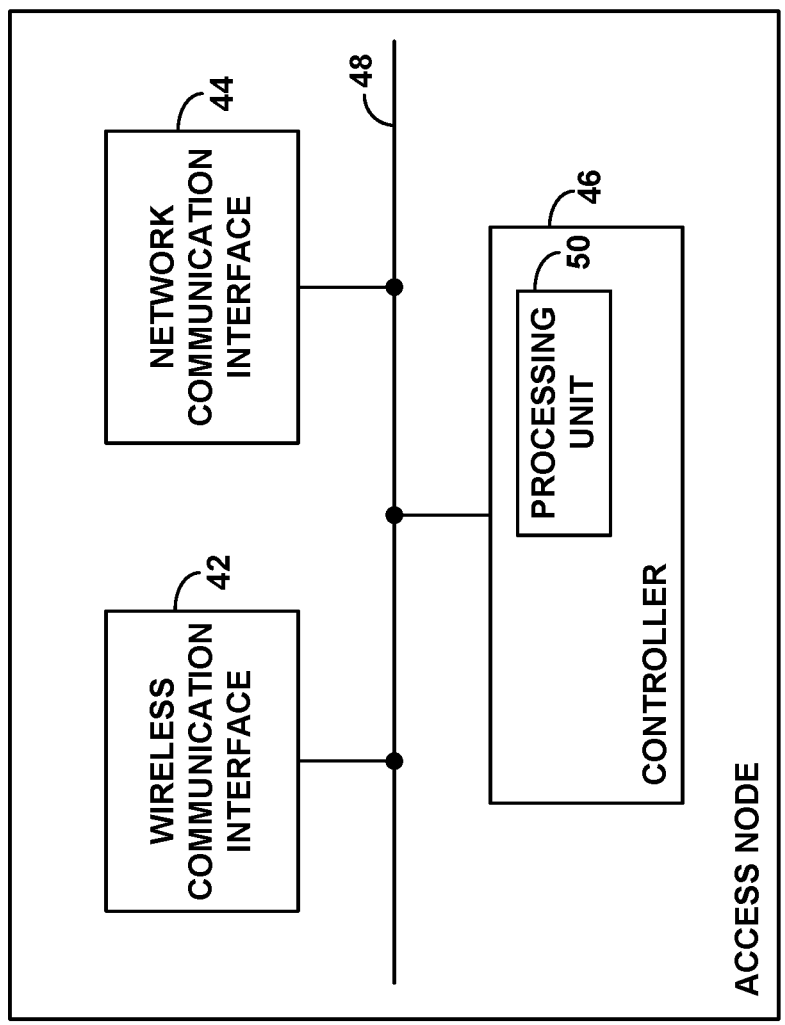

USE OF HISTORICAL RATE OF DATA FLOW AS BASIS TO LIMIT QUANTITY OF CONCURRENT AIR-INTERFACE CONNECTIONS

BACKGROUND

A cellular wireless network typically includes a number of access nodes that are configured to provide wireless coverage areas, such as cells and cell sectors, in which user equipment devices (UEs) such as cell phones, tablet computers, machine-type-communication devices, tracking devices, embedded wireless modules, and/or other wirelessly equipped communication devices (whether or not user operated), can operate. Each access node could be coupled with a core network that provides connectivity with various application servers and/or transport networks, such as the public switched telephone network (PSTN) and/or the Internet for instance. With this arrangement, a UE within coverage of the cellular network could engage in air-interface communication with an access node and could thereby communicate via the access node with various application servers and other entities.

Such a network could operate in accordance with a particular radio access technology (RAT), with communications from the access nodes to UEs defining a downlink or forward link and communications from the UEs to the access nodes defining an uplink or reverse link.

Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which can facilitate mobile broadband service using technologies such as orthogonal frequency division multiplexing (OFDM) and multiple input multiple output (MIMO). And recently, the industry has completed initial specifications for in "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each access node could be configured to provide coverage and service on one or more radio-frequency (RF) carriers. Each such carrier could be frequency division duplex (FDD), with separate frequency channels for downlink and uplink communication, or time division duplex (TDD), with a single frequency channel multiplexed over time between downlink and uplink use. And each such frequency channel could be defined as a specific range of frequency (e.g., in RF spectrum) having a bandwidth (width in frequency) and a center frequency and thus extending from a low-end frequency to a high-end frequency.

Further, each carrier could be defined within an industry standard frequency band, by its frequency channel(s) being defined within the frequency band. Examples of such frequency bands include, without limitation, (i) bands 2, 4, 12, 25, 26, 66, 71, and 85, supporting FDD carriers (ii) band 41, supporting TDD carriers, and (iii) bands n258, n260, and n261, supporting FDD and TDD carriers.

The coverage provided by a given access node on a given carrier could also be considered to define a respective "cell". Thus, if an access node provides coverage and service on two carriers, the access node would be providing two cells, one on each carrier. And if two access nodes provide coverage and service on the same carrier as each other, the access nodes would be providing different respective cells than each other, both on the same carrier.

On the downlink and uplink, the coverage of each such cell could define an air interface configured in a specific manner to provide physical resources for carrying information wirelessly between the access node and UEs.

Without limitation, for instance, the air interface could be divided over time into a continuum of frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval, the resource elements on the downlink and uplink could be grouped to define physical resource blocks (PRBs) that the access node could allocate as needed to carry data between the access node and served UEs.

In addition, certain resource elements on the example air interface could be reserved for special purposes. For instance, on the downlink, certain resource elements could be reserved to carry reference signals or the like that UEs could measure in order to determine coverage strength, and other resource elements could be reserved to carry other control signaling such as PRB-scheduling directives and acknowledgement messaging from the access node to UEs. And on the uplink, certain resource elements could be reserved to carry random access signaling from UEs to the access node, and other resource elements could be reserved to carry other control signaling such as PRB-scheduling requests, acknowledgement messaging, and channel-quality reports from UEs to the access node.

OVERVIEW

When a UE enters into coverage of an example network, the UE could detect threshold strong coverage of an access node on a particular carrier (e.g., a threshold strong reference signal broadcast by the access node on that carrier) and could then engage in random-access and connection signaling, such as Radio Resource Control (RRC) signaling, with the access node to establish an air-interface connection (e.g., RRC connection) between the access node and the UE, through which the access node will then serve the UE on the carrier.

Further, if the UE is not already registered for service with the core network, the UE could transmit to the access node an attach request, which the access node could forward to a core-network controller for processing. And the core-network controller could then coordinate setup for the UE of one or more user-plane bearers, each of which could include (i) an access-bearer portion that extends between the access node and a core-network gateway system that provides connectivity with a transport network and (ii) a data-radio-bearer (DRB) portion that extends over the air between the access node and the UE.

Once the UE is so connected and registered, the access node could then serve the UE in a connected mode in the carrier, managing downlink air-interface communication of packet data to the UE and uplink air-interface communication of packet data from the UE.

For instance, when the core-network gateway system receives user-plane data for transmission to the UE, the data could flow to the access node, and the access node could buffer the data, pending transmission of the data to the UE. With the example air-interface configuration noted above, the access node could then allocate downlink PRBs of the carrier to carry at least a portion of the data, defining a transport block, to the UE. And the access node could then transmit to the UE a Downlink Control Information (DCI) scheduling directive that designates the allocated PRBs and could accordingly transmit the transport block to the UE in those designated PRBs.

Likewise, on the uplink, when the UE has user-plane data for transmission on the transport network, the UE could buffer the data, pending transmission of the data to the access node, and the UE could transmit to the access node a scheduling request that carries a buffer status report (BSR) indicating the quantity of data that the UE has buffered for transmission. With the example air-interface configuration noted above, the access node could then allocate uplink PRBs of the carrier to carry a transport block of the data from the UE and could transmit to the UE a DCI scheduling directive that designates those upcoming PRBs, and the UE could accordingly transmit the transport block to the access node in the designated PRBs.

These scheduled air-interface communications between the access node and the UE could support communication of packet data at an effective data rate that could vary based on a number of factors. Without limitation, one factor that could impact the supported data rate is the UE's channel quality, such as how strong the UE's coverage is and/or how much interference or noise exists on the air interface. For instance, relatively poor channel quality could result in a lower effective data rate (i) by requiring transmission of relatively substantial error-correction information together with the underlying data, (ii) by limiting the number of bits of the combined packet data and error-correction coding that can be transmitted per PRB, and/or (iii) by requiring repeat transmission attempts in order to achieve successful transmission. Whereas, relatively good channel quality could result in a higher effective data rate (i) by allowing transmission of the underlying data with less added error-correction coding, (ii) by allowing more bits to be transmitted per PRB, and/or (iii) by requiring less re-transmission.

In practice, a representative such access node may serve multiple UEs at once on a given carrier. For instance, each of multiple UEs could discover coverage of the access node on the carrier and could connect with the access node on the carrier as noted above. And the access node could then manage air-interface communication of packet data to and from each such UE as described above.

To facilitate serving multiple UEs at once on a given carrier, given the limited number of PRBs that the carrier bandwidth defines per unit time, the access node could apply a scheduling algorithm in an effort to fairly allocate those PRBs among the served UEs.

Unfortunately, however, one technical problem that could arise when an access node serves multiple UEs at once is that the access node may not be able to accommodate service level requirements or expectations for some or all of the UEs. In particular, although the access node may work to fairly allocate the carrier's PRBs among the served UEs, and although the UEs might have different levels of channel quality and different associated data-rate support than each other, at some point the level of UE demand for data communication could exceed the carrier's capacity. When that happens, the access node may be forced to serve some or all of the UEs with fewer PRBs than desired, which could give rise to user experience issues and other problems.

The present disclosure provides a mechanism that may help to address this problem.

In accordance with the disclosure, a computing system will use the aggregate rate of data served by the access node on the carrier (i.e., the aggregate rate of data flow on the carrier) as a basis to set a maximum number of UEs that the access node will allow to be concurrently connected with the access node on the carrier, possibly on a per time of day basis. The aggregate rate of data flow on the carrier could be an aggregate total across all UEs connected with the access node on the carrier, and the evaluation could be with respect to the downlink and/or the uplink.

At times when the access node serves a relatively high aggregate rate of data on the carrier, the computing system could set the maximum number of UEs to a relatively low number, to help ensure that the access node can accommodate the service level requirements of the connected UEs. Whereas, at times when the access node serves a relatively low rate of data on the carrier, the computing system could set the maximum number of UEs to a relatively high number, as the limited carrier capacity may accommodate the lighter data flow.

Further, the evaluation of aggregate rate of data flow on the carrier in this process could be based on historical usage records. For instance, on a per time-of-day basis, the computing system could track the aggregate rate of data served by the access node on the carrier. And based on that tracking, the computing system could thereby determine what aggregate rate of data the access node tends to serve on the carrier at a given time of day. Then at or approaching that time of day on a given day, the computing system could map this determined aggregate rate of data flow to an associated maximum limit on quantity of UEs that the access node would allow to be concurrently connected with the access node on the carrier, and the computing system could cause the access node to apply that limit.

These as well as other aspects, advantages and alternatives will become apparent to those reading the following description, with reference where appropriate to the accompanying drawings. Further, it should be understood that the discussion in this overview and elsewhere in this document is provided by way of example only and that numerous variations are possible.

BRIEF DESCRIPTION OF THE DRAWINGS

FIG. 4 is a simplified block diagram of an example access node operable in accordance with the disclosure.

DETAILED DESCRIPTION

An example implementation will now be described in the context of a system that supports 4G LTE and/or 5G NR service. However, it should be understood that the principles disclosed herein could extend to apply with respect to other scenarios as well, such as with respect to other RATs. Further, it should be understood that other variations from the specific arrangements and processes described are possible. For instance, various described entities, connections, functions, and other elements could be added, omitted, distributed, re-located, re-ordered, combined, or changed in other ways. In addition, it should be understood that operations described as being performed by one or more entities could be implemented in various ways, such as by a processor executing instructions stored in non-transitory data storage, along with associated circuitry or other hardware, among other possibilities.

Figure 1:
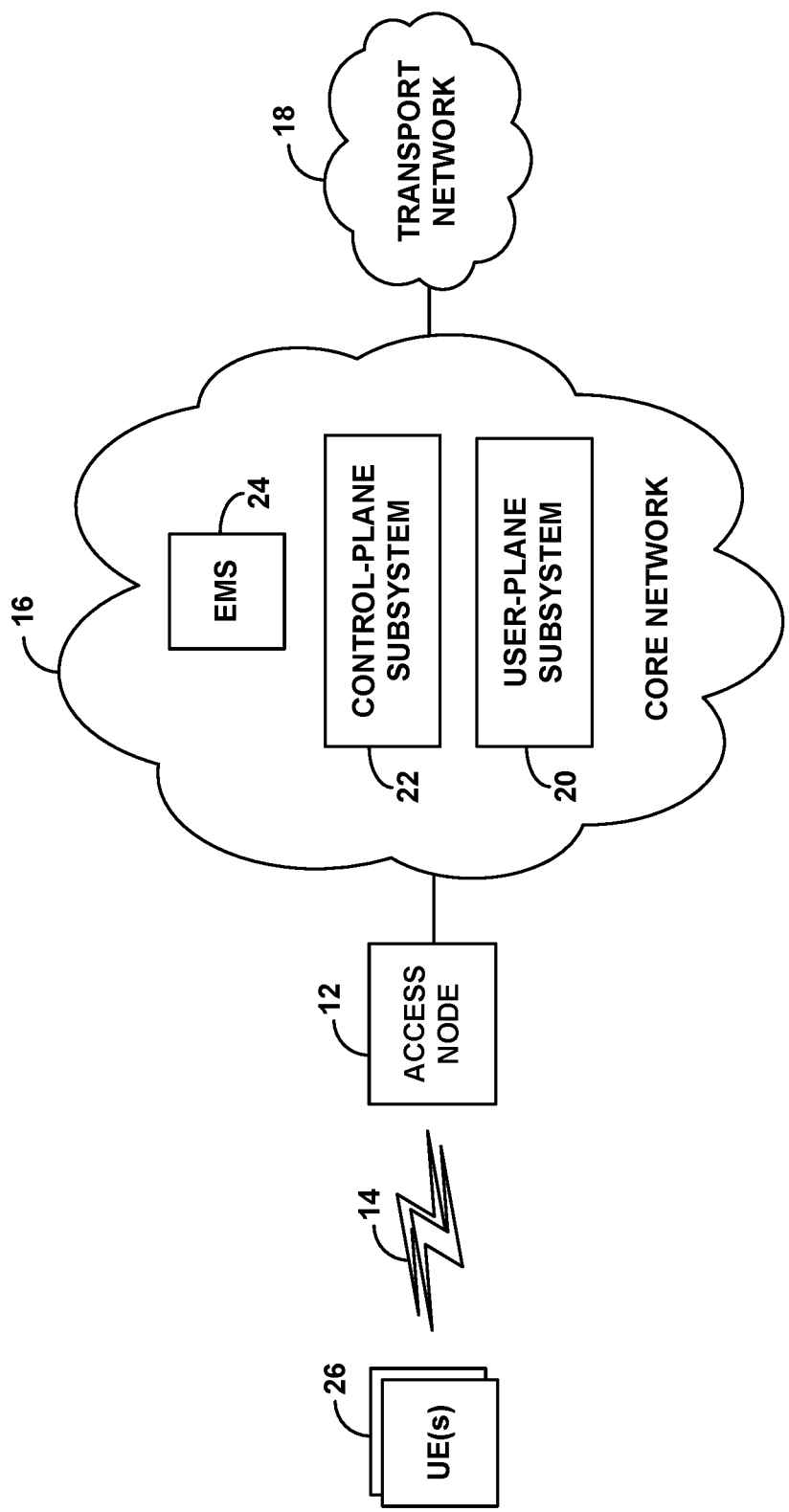
FIG. 1 is a simplified block diagram of an example communication system in which aspects of the present disclosure can be implemented.

Referring to the drawings, FIG. 1 depicts an example network having an access node 12 that is configured to provide coverage and service on one or more carriers 14. Without limitation, this access node 12 could be a 4G LTE access node (e.g., evolved Node-B (eNB)) or a 5G NR access node (e.g., next generation Node-B (gNB)). Further, the access node could be a macro access node of the type configured to provide a wide range of coverage or could take other forms, such as a small cell access node, a relay node, a femtocell access node, or the like, which might be configured to provide a smaller range of coverage, among other possibilities.

In a representative implementation, each carrier 14 could be FDD or TDD and could be defined in a given band such as one of those noted above. If the carrier is FDD, the carrier would have separate downlink and uplink channels, and each of these channels would have a respective center frequency and a respective bandwidth. Whereas, if a carrier is TDD, the carrier would have a single channel with a center frequency and bandwidth, and the access node could configure the air-interface on the carrier to have a particular downlink-uplink configuration.

Further, the air interface on each such channel could be structured as described above by way of example, being divided over time into frames, subframes, timeslots, and symbol time segments, and over frequency into subcarriers, thus defining an array of air-interface resource elements grouped into PRBs allocable by the access node as noted above, for use to carry data to or from served UEs. Carrier-structure and/or service on 4G and 5G, however, could differ from each other in various ways now known or later developed, such as with one implementing variable subcarrier spacing and the other having fixed subcarrier spacing, with one having flexible TDD configuration and the other having fixed TDD configuration, with one having different subcarrier spacing and/or symbol time segment length than the other, and/or with one making different use of MIMO technologies than the other, among other possibilities.

As further shown, the access node could be interfaced with a core network 16 that provides connectivity with an external transport network 18 such as the Internet for instance. Examples of such core networks include, without limitation, an Evolved Packet Core (EPC) network typically used for 4G LTE service and a Next Generation Core (NGC) network typically used for 5G NR service.

The core network 16 could include a user-plane subsystem 20, which could operate to carry user-plane communications, such as packet-data communications, to and from the transport network 18, and a control-plane subsystem 22, which could operate to support various control functions such as attachment, authentication, mobility management, and bearer management, among others. In an example EPC arrangement for instance, the user-plane subsystem 20 could include one or more gateways (not shown) such as a packet-data-network gateway (PGW) that provides connectivity with the transport network and a serving gateway (SGW) that interfaces between the PGW and the access node. And in the example EPC arrangement, the control-plane subsystem could include a mobility management entity (MME) (not shown) that functions as a core-network controller, and a home subscriber server (HSS) (not shown) that stores or has access to UE profile records to facilitate authentication and other operations. Other example core-network arrangements are possible as well.

The example core network is also shown including an element management system (EMS) 24. EMS 24 could be a computing-system platform configured to operate as a central repository of operational data for the wireless communication network and to control and manage operation of various network elements.

FIG. 1 also depicts various example UEs 26 that may from time to time be within coverage of access node 12 and may from time to time be served by the access node 12. Each of these UEs could take any of the forms noted above, among other possibilities.

Upon entering into coverage the access node 12, a representative such UE could scan for coverage and discover coverage of the access node 12 on a carrier 14 and could then responsively engage in signaling to connect with the access node on that carrier as discussed above. Further, the UE could then transmit to the access node an attach request message, which the access node could forward to a core-network controller of the core-network control-plane subsystem 22, to trigger setup for the UE one or more user-plane bearers as noted above.

Once the UE is connected and attached, the access node could then serve the UE on the carrier as described above. For instance, when the user-plane subsystem receives packet data for transmission to the UE, that packet data could flow over an appropriate bearer to the access node, and the access node could schedule and provide transmission of the packet data to the UE on one or more downlink PRBs of the carrier. And when the UE has packet data to transmit, the UE could transmit a scheduling request to the access node, the access node could direct the UE to transmit the data on one or more uplink PRBs of the carrier, and the UE could accordingly transmit the data on the indicated uplink PRB(s), and the access node could forward the data over an appropriate bearer for output on the transport network.

Note also that the access node may support providing carrier-aggregation service for the UE, by adding one or more secondary carriers to the UE's connection with the access node and then serving the UE on the aggregate of those carriers. In particular, when a UE is connected with the access node on a given carrier, the access node may add one or more additional carriers to the UE's connection, so that the UE would then effectively be connected with the access node on the multiple carriers in combination—typically with one carrier (e.g., the initial carrier) being a primary component carrier (PCC) of the UE's connection and each other carrier being a secondary component carrier (SCC) of the UE's connection.

With carrier-aggregation service, when the access node receives packet-data for transmission to the UE, the access node may schedule and engage in transmission of the data to the UE on downlink PRBs distributed across the UE's various component carriers. And likewise, when the UE has data to transmit and sends a scheduling request to the access node, the access node could schedule, and the UE could engage in transmission of the data on uplink PRBs distributed across the UE's various component carriers.

When the access node serves the UE, with or without carrier aggregation, the access node could keep track of the volume of data that the access node serves for the UE, possibly in aggregate on the downlink and the uplink. This volume of data could be the number of bits of packet data or other such user-plane data that the access node successfully communicates over the air to/from the UE. Further, the access node could generate data-usage records that indicate quantity of such data served for the UE, and the access node could periodically report that data usage to various systems, such as to a core-network controller, the EMS 24, and/or a billing system.

In operation, as noted above, the access node may also serve multiple UEs at once on a given carrier 14. In particular, there may be times when multiple UEs are connected with the access node 12 on the carrier. For each such UE, the carrier might be the sole carrier of the UE's connection with the access node, or the carrier might be a PCC or SCC of the UE's connection with the access node. Further, as noted above, when the access node serves multiple UEs at once on a carrier, the access node may attempt to fairly allocate PRBs or other air-interface resources of the carrier among the multiple UEs. But as additionally noted above, there could be times when the access node serves many UEs concurrently on the carrier and, given the limited number of PRBs defined per unit time by the carrier's bandwidth, the access node may be unable to meet service level expectations or requirements for some or all of the UEs.

As indicated above, the presently disclosed mechanism could help to address this issue by dynamically controlling the maximum number of UEs that the access node will allow to be connected with the access node on the carrier, with the dynamic control being based on an aggregate rate of data that the access node serves on the carrier.

As noted above, a computing system could track an aggregate rate of data served by the access node on the carrier, possibly on a per time-of-day basis, and the computing system could use the aggregate rate of data flow on the carrier as a basis configure the access node to limit the maximum quantity of UEs that the access node will allow to be concurrently connected with the access node on the carrier. By limiting the quantity of concurrent air-interface connections with the access node on the carrier, the computing system could help ensure that the access node can accommodate the service level requirements of UEs connected with the access node on the carrier.

The computing system that carries out this process could be provided at various locations, possibly by a combination of entities. For example, the computing system could be provided at the access node itself, in which case the access node could determine the aggregate rate of data flow on the carrier and could set itself to apply an associated maximum limit on the number of UEs that the access node will allow to be concurrently connected with the access node on the carrier. Further, as another example, the computing system could be provided at an entity external to the access node, such as at the EMS 24 for instance, in which case the computing system could determine the aggregate rate of data flow on the carrier and could signal to the access node to cause the access node to set and apply an associated maximum limit on the number of UEs that the access node will allow to be concurrently connected with the access node on the carrier.

In practice, the computing system could monitor in various ways the aggregate rate of data that the access node serves on the carrier. At issue here could be the total volume of packet data and/or other such user-plane data that the access node serves per unit time on the carrier, in aggregate across multiple UEs that the access node serves on the carrier.

As noted above, the access node may generate and provide usage records that indicate the quantity of data served per UE. At least in part to help facilitate this present process, the access node could structure those usage records to indicate the quantity of data served on a per carrier basis and on a time-of-day basis. And the computing system could roll up those usage records for multiple served UEs to compute an aggregate rate of data served by the access node.

Further, as noted above, the computing system could track the aggregate rate of data served by the access node on the carrier on a per time-of-day basis. For instance, the computing system could roll up the usage data to determine an historical average aggregate rate of data served by the access node at particular times of day, such as particular hour ranges (e.g., morning, afternoon, evening, overnight, etc.) And the computing system could use that computed average as a prediction of the rate of data flow at an upcoming time of day, as a basis to configure a maximum limit on quantity of UEs that the access node would allow to be concurrently connected with the access node at that time of day. For instance, the computing system could predict what the aggregate rate of data flow will be at an upcoming time of day and, in view of that predicted aggregate rate of data flow, could therefore configure the maximum limit to be applied at that upcoming time of day.

The computing system could then apply various techniques to determine and configure, based on the aggregate rate of data flow on the carrier, a maximum number of UEs that the access node should allow to be concurrently connected with the access node on the carrier.

In practice, for instance, the computing system could include or have access to a set of mapping data that correlates (i) various aggregate rates of data flow on the carrier respectively with (ii) various maximum numbers of UEs to be concurrently connected with the access node on the carrier. This mapping data could be established by engineering design for present purposes. Given this mapping data, once the computing system has determine the aggregate rate of data flow on the carrier, the computing system could refer to the mapping data to determine a maximum number of UEs that the mapping data correlates with the determined aggregate rate of data flow. And the computing system could then configure the access node to apply that determined maximum number as a limit on the number of UEs that could be concurrently connected with the access node on the carrier.

Alternatively, the access node might have a default setting of the maximum number of UEs that the access node would allow to be concurrently connected with the access node on the carrier, and the computing system may adjust that setting when the aggregate rate of data flow on the carrier meets a threshold limit. For instance, the computing system could determine when the aggregate rate of data flow on the carrier is at least as high as a predefined threshold high rate, and, in response to at least that determination, the computing system could reduce the setting from the default maximum number of UEs allowed to be concurrently connected with the access node on the carrier to a lower maximum number of UEs allowed to be concurrently connected with the access node on the carrier.

Note also that, in a situation where the computing system determines in advance the maximum limit that the access node should apply at an given time of day, the computing system could take action to help ensure that the access node successfully applies that limit at that time. For instance, in an effort to avoid having more than the maximum number of UEs be concurrently connected with the access node at that given time of day, the computing system could configure the maximum limit to apply starting at a time sufficiently before the given time of day and thus leading up to the given time of day.

The access node can apply in various ways the determined maximum limit on number of UEs that the access node would allow to be concurrently connected with the access node on the carrier. In practice, for instance, the access node could store an indication of the maximum limit, and the access node could then consider that stored limit when considering whether to grant a new UE connection on the carrier and/or whether to add the carrier to a UE's existing connection on another carrier. If and when the access node already has the maximum number of UEs connected on the carrier, the access node could decline to accept any new RRC connection requests seeking new UE connections on the carrier and could forgo adding the carrier to any UE's existing RRC connection with the access node. Whereas, if and when the access node does not yet have the maximum number of UEs connected on the carrier, the access node could accept new RRC connection requests seeking new UE connections on the carrier and could also add the carrier to existing RRC connections.

Note also that applying the maximum number of UEs that the access node will allow to be concurrently connected with the access node on the carrier could involve applying the limit but not disconnecting excess connected UEs. For instance, if the computing system sets the maximum limit to a level that is lower than the number of UEs already connected with the access node on the carrier, the access node could retain the excess connections and allow the connections to be released in the normal course over time. But the access node could then block any new UE connections on the carrier if and when the maximum number of UEs is already connected with the access node on the carrier.

In addition, note that the principles described above could be extended to apply more generally with respect to connections with an access node on any or all of possibly multiple carriers on which the access node is configured to provide service. For instance, a computing system could determine an aggregate rate of data served by the access node more generally rather than specifically on a per-carrier basis, the computing system could map that determined aggregate rate of data flow to an associated maximum limit on quantity of UEs that the access node should allow to be concurrently connected with the access node, and the computing system could then set the access node to apply that maximum limit. Other variations could be possible as well.

Figure 2:
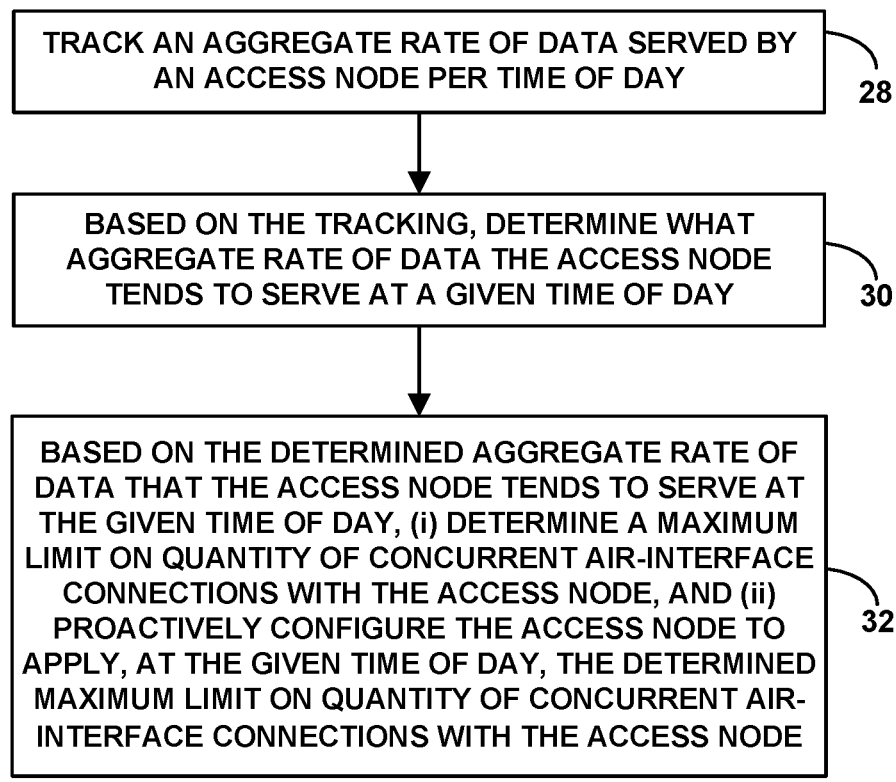
FIG. 2 is a flow chart depicting an example method in accordance with the disclosure.

FIG. 2 is a flow chart depicting a method that can be carried out in accordance with the present disclosure, to control a maximum quantity of concurrent air-interface connections with an access node.

As shown in FIG. 2, at block 28, the method includes a computing system tracking an aggregate rate of data served by the access node per time of day. Further, at block 30, the method includes, based on the tracking, the computing system determining what aggregate rate of data the access node tends to serve at a given time of day. And at block 32, the method includes, based on the determined aggregate rate of data that the access node tends to serve at the given time of day, the computing system (i) determining a maximum limit on quantity of concurrent air-interface connections with the access node, and (ii) proactively configuring the access node to apply, at the given time of day, the determined maximum limit on quantity of concurrent air-interface connections with the access node.

In line with the discussion above, the access node could operate on multiple carrier frequencies. And in that case, the maximum limit on quantity of concurrent air-interface connections with the access node could be a maximum limit on quantity of concurrent air-interface connections with the access node on a particular carrier frequency, and the aggregate rate of data served by the access node is a rate of data flow on the particular carrier frequency.

In addition, as discussed above, the act of tracking the aggregate rate of data served by the access node per time of day could be based on data usage records. Further, the act of determining what aggregate rate of data the access node tends to serve at the given time of day could be based on what aggregate rate of data the access node served on past days at the given time of day. And the given time of day could a given range of time.

Still further, as further discussed above, the method could be carried out at least in part by an entity other than the access node. In that case, the act of proactively configuring the access node to apply, at the given time of day, the maximum limit on quantity of concurrent air-interface connections with the access node could include transmitting to the access node a control signal indicating the determined maximum limit. And the access node could be configured to respond to the control signal by limiting itself to allow no more than the indicated determined maximum quantity of concurrent air-interface connections with the access node.

Alternatively or additionally, the access node could carry out the method. And in that case, the method could include, in accordance with the configuring, the access node limiting, at the given time of day, the quantity of concurrent air-interface connections with the access node to not exceed the selected maximum limit.

In addition, the act of limiting, at the given time of day, the quantity of concurrent air-interface connections to be no more than the selected maximum quantity could include restricting the quantity to be no more than the maximum quantity for a time leading up to the given time of day, to help avoid having more than the maximum quantity at the given time of day.

Additionally or alternatively, the act of limiting, at the given time of day, the quantity of concurrent air-interface connections to be no more than the determined maximum limit could include, (a) at the given time of day, receiving by the access node a request to establish a new air-interface-connection, and (b) responsive to the request, the access node (i) making a determination of whether the access node already has the maximum quantity of concurrent air-interface connections, (ii) if the determination is affirmative, then, based on the determination, rejecting the request, and (iii) if the determination is negative, then, based on the determination, granting the request.

Still further, as discussed above, the computing system could have access to mapping data that correlates each of various aggregate rates of data served by the access node with a respective with a respective maximum quantity of concurrent air-interface connections. And, in that case, the act of determining the maximum limit based on the determined aggregate rate of data that the access node tends to serve at the given time of day could involve referring to the mapping data to determine as the selected maximum limit the respective maximum quantity of concurrent air-interface connections that the mapping data correlates with the determined aggregate rate of data.

Further, the act of determining the maximum limit based on the determined aggregate rate of data that the access node tends to serve at the given time of day could involve (i)

determining that the determined aggregate rate of data flow is at least as high as a predefined threshold and (ii) responsive to at least the determining that the determined aggregate rate of data flow is at least as high as a predefined threshold, adjusting the maximum limit from a default level to a reduced level.

Figure 3:
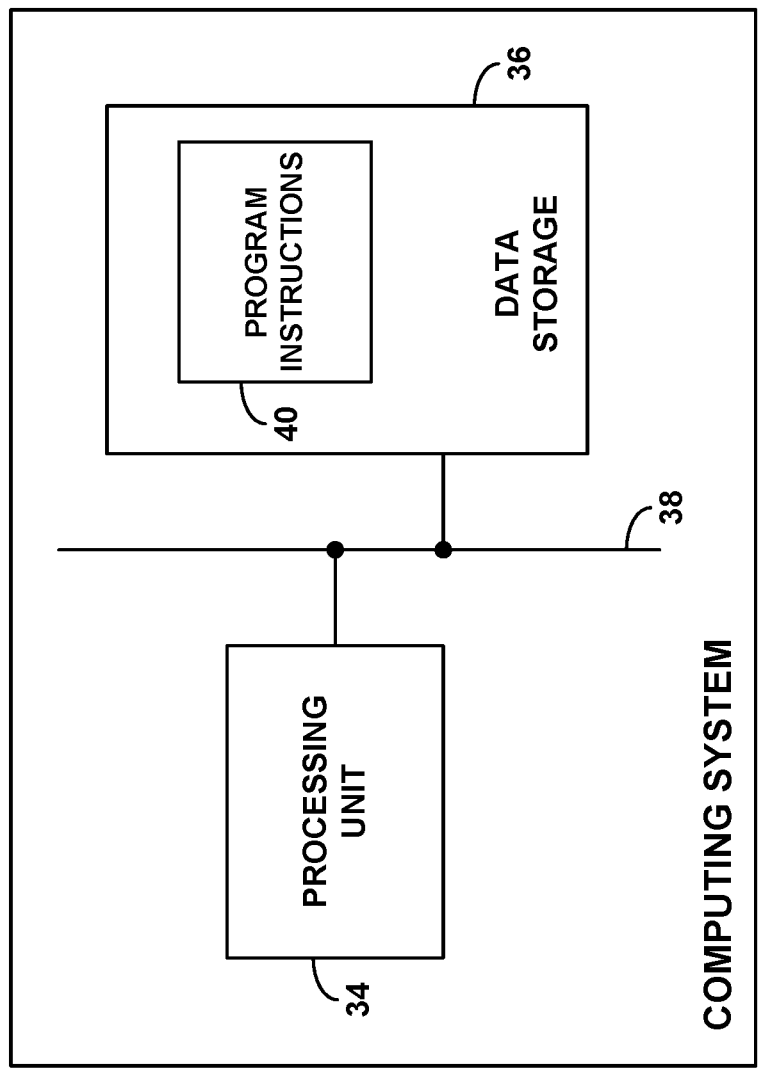
FIG. 3 is a simplified block diagram of an example computing system operable in accordance with the disclosure.

FIG. 3 is next a block diagram of an example computing system that could be configured to carry out operations such as those discussed above, to control a maximum quantity of concurrent air-interface connections with an access node. This computing system could be implemented by various entities in the wireless communication system.

As shown in FIG. 3, the example computing system includes at least one processing unit 34 and at least one non-transitory data storage 36, which could be integrated together or interconnected by a system bus, network, or other connection mechanism 38. The processing unit 34 could comprise one or more general purpose processors (e.g., microprocessors) and/or one or more special purpose processors (e.g., application specific integrated circuits). And the data storage 36 could comprise one or more volatile and/or non-volatile storage components (e.g., magnetic, optical, or flash storage, necessary non-transitory).

As further shown, the data storage 36 could store program instructions 40. These program instructions 40 could be executable by the processing unit 34 to carry out operations such as those discussed above, among other possibilities. For instance, the operations could include (a) determining an aggregate rate of data that the access node serves, and based on the determined aggregate rate of data that the access node serves (i) determining a maximum limit on quantity of concurrent air-interface connections with the access node, and (ii) configuring the access node to apply the determined maximum limit on quantity of concurrent air-interface connections with the access node.

Various other features described herein can be implemented in this context as well, and vice versa.

Finally, FIG. 4 is next a simplified block diagram of an example access node that could operate in line with the method as discussed herein. As shown in FIG. 4, the example access node includes a wireless communication interface 42, a network communication interface 44, and a controller 46, which could be integrated together or communicatively linked together by a system bus, network, or other connection mechanism 48.

In this example arrangement, the wireless communication interface 42 could be configured to provide cellular coverage and to engage in air-interface communication with served UEs. As such, wireless communication interface 42 could comprise an antenna structure, which could be tower mounted or could take other forms, and associated components such as power amplifiers and a wireless transceiver, to facilitate providing a coverage area on one or more carriers and engaging in air-interface communication according to a RAT such as any of those noted above.

Further, the network communication interface 44 could be configured to support backhaul communication, such as communication on a core network. The network communication interface 44 could thus comprise a wired or wireless interface, such as an Ethernet network communication interface, configured to support communication with various entities.

Controller 46 could then comprise control logic to cause the access node to carry out particular operations including those described herein. As such, the controller 46 could take various forms, including but not limited to a programmed processing unit 50. The programmed processing unit may include one or more processors (e.g., one or more general purpose microprocessors and/or one or more dedicated processing units) and non-transitory data storage (e.g., one or more volatile and/or non-volatile storage components, such as magnetic, optical, or flash storage, necessarily non-transitory) holding program instructions executable by the processing unit to cause the processing unit and thus the access node to carry out various operations described herein.

Various features described herein can be implemented in this context as well, and vice versa.

The present disclosure also contemplates at least one non-transitory computer readable medium (e.g., one or more magnetic, optical, of flash storage components, necessarily non-transitory) having stored thereon (e.g., being encoded with) or otherwise containing program instructions executable by a processor to carry out various operations as described herein.

Exemplary embodiments have been described above. Those skilled in the art will understand, however, that changes and modifications may be made to these embodiments without departing from the true scope and spirit of the invention.

What is claimed is:

1. A method for controlling maximum quantity of concurrent air-interface connections with an access node on a carrier, the method comprising:
    tracking, by a computing system, an aggregate rate of data served by an access node per time of day;
    based on the tracking, the computing system determining what aggregate rate of data the access node tends to serve at a given time of day; and
    based on the determined aggregate rate of data that the access node tends to serve at the given time of day, the computing system (i) determining a maximum limit on quantity of concurrent air-interface connections with the access node, and (ii) proactively configuring the access node to apply, at the given time of day, the determined maximum limit on quantity of concurrent air-interface connections with the access node.

2. The method of claim 1, wherein the access node operates on multiple carrier frequencies, wherein the maximum limit on quantity of concurrent air-interface connections is a maximum limit on quantity of concurrent air-interface connections with the access node on a particular carrier frequency, and wherein the aggregate rate of data served by the access node is a rate of data flow on the particular carrier frequency.

3. The method of claim 1, wherein tracking the aggregate rate of data served by the access node per time of day is based on data usage records.

4. The method of claim 1, wherein determining what aggregate rate of data the access node tends to serve at the given time of day is based on what aggregate rate of data the access node served on past days at the given time of day.

5. The method of claim 1, wherein the given time of day is a given range of time.

6. The method of claim 1, wherein the method is carried out at least in part by an entity other than the access node, and wherein proactively configuring the access node to apply, at the given time of day, the maximum limit on quantity of concurrent air-interface connections with the access node comprises transmitting to the access node a control signal indicating the determined maximum limit,
    wherein the access node is configured to respond to the control signal by limiting itself to allow no more than the indicated determined maximum limit on quantity of concurrent air-interface connections with the access node.

7. The method of claim 1, wherein the method is carried out at least in part by the access node, the method further comprising:
in accordance with the configuring, limiting by the access node, at the given time of day, the quantity of concurrent air-interface connections with the access node to not exceed the maximum limit.

8. The method of claim 7, wherein limiting, at the given time of day, the quantity of concurrent air-interface connections to not exceed the maximum limit comprises:
restricting the quantity to be no more than the maximum limit for a time leading up to the given time of day, to help avoid having the quantity exceed the maximum limit at the given time of day.

9. The method of claim 7, wherein limiting, at the given time of day, the quantity of concurrent air-interface connections to be no more than the determined maximum limit comprises:
at the given time of day, receiving by the access node a request to establish a new air-interface-connection; and
responsive to the request, the access node (i) making a determination of whether the access node already has the maximum quantity of concurrent air-interface connections, (ii) if the determination is affirmative, then, based on the determination, rejecting the request, and (iii) if the determination is negative, then, based on the determination, granting the request.

10. The method of claim 1, wherein the computing system has access to mapping data that correlates each of various aggregates rates of data served by the access node with a respective maximum quantity of concurrent air-interface connections, and
wherein determining the maximum limit based on the determined aggregate rate of data that the access node tends to serve at the given time of day comprises referring to the mapping data to determine as the selected maximum limit the respective maximum quantity of concurrent air-interface connections that the mapping data correlates with the determined aggregate rate of data.

11. The method of claim 1, wherein determining the maximum limit based on the determined aggregate rate of data that the access node tends to serve at the given time of day comprises:
determining that the determined aggregate rate of data flow is at least as high as a predefined threshold; and
responsive to at least the determining that the determined aggregate rate of data flow is at least as high as a predefined threshold, adjusting the maximum limit from a default level to a reduced level.

12. A computing system for controlling maximum quantity of concurrent air-interface connections with an access node, the computing system comprising:
at least one processing unit;
at least one non-transitory data storage; and
program instructions stored in the at least one non-transitory data storage and executable by the at least one processing unit to carry out operations including:
determining an aggregate rate of data that the access node serves, and
based on the determined aggregate rate of data that the access node serves (i) determining a maximum limit on quantity of concurrent air-interface connections with the access node, and (ii) configuring the access node to apply the determined maximum limit on quantity of concurrent air-interface connections with the access node.

13. The computing system of claim 12, wherein the access node operates on multiple carrier frequencies, wherein the maximum limit on quantity of concurrent air-interface connections is a maximum limit on quantity of concurrent air-interface connections with the access node on a particular carrier frequency, and wherein the aggregate rate of data served by the access node is a rate of data flow on the particular carrier frequency.

14. The computing system of claim 12, wherein determining the aggregate rate of data served by the access node is based on data usage records.

15. The computing system of claim 12, wherein the computing system comprises an entity other than the access node, and wherein configuring the access node to apply the determined maximum limit on quantity of concurrent air-interface connections with the access node comprises transmitting to the access node a control signal indicating the selected maximum quantity,
wherein the access node is configured to respond to the control signal by limiting itself to allow no more than the indicated determined maximum limit on quantity of concurrent air-interface connections with the access node.

16. An access node configured to control maximum quantity of concurrent air-interface connections with the access node, the access node comprising:
a wireless communication interface through which the access node is configured to provide air-interface service to user equipment devices (UEs);
a network communication interface through which the access node is configured to communicate on a core network; and
a controller configured to cause the access node to carry out operations including:
tracking an aggregate rate of data served by an access node per time of day,
based on the tracking, determining what aggregate rate of data the access node tends to serve at a given time of day, and
based on the determined aggregate rate of data that the access node tends to serve at the given time of day, (i) determining a maximum limit on quantity of concurrent air-interface connections with the access node, and (ii) setting the access node to apply, at the given time of day, the determined maximum limit on quantity of concurrent air-interface connections with the access node.

17. The access node of claim 16, wherein the controller comprises at least one programmed processing unit.

18. The access node of claim 16, further comprising, in accordance with the setting, limiting by the access node, at the given time of day, the quantity of concurrent air-interface connections with the access node to be no more than the determined maximum limit.

19. The access node of claim 18, wherein limiting, at the given time of day, the quantity of concurrent air-interface connections to be no more than the determined maximum limit comprises preventing new air-interface connections that would exceed the maximum limit, but not disconnecting excess air-interface connections.

20. The access node of claim 18, wherein limiting, at the given time of day, the quantity of concurrent air-interface connections to be no more than the determined maximum limit comprises:

at the given time of day, receiving by the access node a request to establish a new air-interface-connection; and responsive to the request, (i) making a determination of whether the access node already has the maximum quantity of concurrent air-interface connections, (ii) if the determination is affirmative, then, based on the determination, rejecting the request, and (iii) if the determination is negative, then, based on the determination, granting the request.

\* \* \* \* \*